United States Patent Office 2,923,694
Patented Feb. 2, 1960

2,923,694

PROCESS FOR MAKING ACRYLONITRILE POLYMER SOLUTION

Wilhelm Georg Schmidt, Walsgrave, Coventry, England, assignor to Courtaulds Limited, London, England, a British company No Drawing. Application September 10, 1956
Serial No. 608,706

Claims priority, application Great Britain September 16, 1955

4 Claims. (Cl. 260—29.6)

This invention relates to the production of solutions of polyacrylonitrile and to the production from such solutions of shaped articles such as threads, fibres, filaments, staple fibres, ribbons, films and the like, hereinafter generally referred to as "threads." The term "polyacrylonitrile" as used in this specification includes simple polymers of acrylonitrile and copolymers containing at least 80 percent of acrylonitrile in the molecule, together with up to 20 percent of one or more other polymerisable compounds such as styrene, methyl acrylate and vinyl acetate, or dyeable additives such as a vinyl pyridine.

It is known that polyacrylonitrile can be dissolved in saturated or nearly saturated aqueous solutions of salts, particularly thiocyanates, and that threads can be produced by extruding such solutions into aqueous coagulating baths. Such procedure usually involves the production and separation of the polyacrylonitrile followed by dissolution of the polymer and extrusion of the resultant solution to form a thread.

It has previously been proposed in United States Patent Number 2,486,943 to carry out the polymerisation of polymerisable compounds, including acrylonitrile, in the presence of concentrated aqueous solutions of inorganic thiocyanates in which both the acrylonitrile and the polymer are soluble so that the solution can be used directly for making threads. As thiocyanates are polymerisation inhibitors the polymerisation is effected according to this prior proposal by heating or by exposure to ultraviolet light or sunshine. Such processes are not entirely satisfactory since the polymerisation process takes considerable time.

The object of the present invention is an improved polymerisation process for producing polyacrylonitrile solutions which can be used directly for extrusion.

According to the present invention, a process for the production of a solution of polyacrylonitrile comprises dissolving acrylonitrile, together with the other copolymerisable compounds when such are used, in a concentrated solution of a thiocyanate containing, for example, about 35% by weight thiocyanate ions and polymerising the monomer or monomers in solution in the presence of a non-oxidising polymerisation catalyst forming free radicals. The preferred catalysts for use in this invention are azo compounds such as aliphatic azo compounds in which both nitrogens are attached directly to a carbon atom of an aliphatic chain, diazoamino compounds, diazosulphones, diazoanhydrides and diazonium compound azodisulphonates. The azo compounds described and claimed in United States Patent Number 2,471,959 are particularly suitable. Specific examples of suitable non-oxidising catalysts are:

(1) Azo-bis-isobutyronitrile $$NC-\underset{\underset{CH_3}{|}}{\overset{\overset{CH_3}{|}}{C}}-N=N-\underset{\underset{CH_3}{|}}{\overset{\overset{CH_3}{|}}{C}}-CN$$

(2) Azo-bis-isobutyric acid esters
(3) Diazoaminobenzene $$C_6H_5-NH-N=N-C_6H_5$$

(4) Phenyl-diazoamine-N=diethyl ethylene diamine (also known as 1-phenyl-3-N-diethylethylene diamine triazene)

$$C_6H_5-NH-N=N-C_2H_4N(C_2H_5)_2$$

$$\updownarrow$$

$$C_6H_5N=N-NH-C_2H_4N(C_2H_5)_2$$

(5) Diazoamino tetrazole $$\begin{array}{c} N=\!\!=\!\!C-NH-N=\!\!N-C=\!\!=\!\!N \\ | \quad\quad | \quad\quad\quad\quad\quad | \quad\quad | \\ N \quad NH \quad\quad\quad HN \quad N \\ \diagdown \diagup \quad\quad\quad\quad\quad\quad \diagdown \diagup \\ N \quad\quad\quad\quad\quad\quad\quad\quad\quad N \end{array}$$

(6) p,p'-Dinitro-diphenylazosulphone $$O_2N-C_6H_4-N=N-SO_2-C_6H_4NO_2$$

(7) Diazoanhydride $$C_6H_5N=N-O-N=N-C_6H_5$$

(8) Potassium azo-disulphonate $$KOSO_2-N=N-SO_2-OK$$

(9) Diazonium diphenylamine (Fast Blue VRT salt)

$$C_6H_5-NH-C_6H_4-N\!\equiv\!N$$
$$|$$
$$Cl$$

Other non-oxidising catalysts which may be used are substituted sulphinic acids, for example, p-amino-benzene sulphinic acid $H \cdot SO_2 \cdot C_6H_4 \cdot NH_2$.

Many of the catalysts defined above improve the dyeing properties of the polyacrylonitrile obtained.

It has been found that the normal type of oxidising catalysts such as peroxy compounds (persulphates and peroxides) are unsuitable for polymerisation in thiocyanate solution because they oxidise thiocyanate to thiocyanogen which is a powerful polymerisation inhibitor.

The thiocyanate solution in which polymerisation is effected may be an aqueous or aqueous alcoholic solution. When aqueous solutions are used the resultant polymer solutions may be spun into cold water baths as described in the Cresswell Patents Numbers 2,558,730 to 2,558,735, or into aqueous alcoholic salt baths as described in application Serial Number 363,420, now abandoned, which corresponds to British patent specification number 732,135 of Courtaulds Limited published June 22, 1955. When aqueous alcoholic solutions are used the polymer solution may be spun into water as described in British patent specification Number 714,530 of Courtaulds Limited published September 1, 1954, or into an aqueous alcoholic salt bath as described in British patent specification Number 729,472 of Courtaulds Limited published May 4, 1955. Aqueous alcoholic spinning solutions may also be prepared by adding an alcohol such as methanol to the polymer solution obtained using an aqueous thiocyanate solution.

Amines or polyamines may also be added to the polymerisation mixture to act as modifiers or chain transfer reagents and so lower the mean molecular weight of the polymer or copolymer. Such amines or polyamines also improve the dyeing properties of the resultant polyacrylonitrile. An example of a suitable amine is lauryl 1:3-propylene diamine.

The amine compound used may be in the form of a quaternary ammonium compound such as is formed by reacting an amine with methyl sulphate; alternatively the fibre obtained by extruding into a coagulant bath an amine-containing aqueous thiocyanate solution of polyacrylonitrile may be treated with methyl sulphate to quaternize the amine in the polymer. Quaternization of the amine improves the stability of the polymer. The catalyst phenyldiazo-amino-N diethylethylene diamine mentioned above acts as an amine chain transfer reagent and the polymer obtained using it may be quaternized as described.

Grafted polymers of acrylonitrile or of acrylonitrile copolymers with other unsaturated compounds may be prepared by the present invention by adding to the concentrated thiocyanate solution before polymerisation of the acrylonitrile, with or without other monomers, begins, a low molecular weight polymer which is soluble in the thiocyanate solution. Examples of suitable polymers for grafting with acrylonitrile are polyvinyl alcohols of molecular weight of the order of 500 to 1,000, and polyethyleneimines; grafting with polyethyleneimines also serves to improve the dyeing properties of the polymers obtained. The term "grafted polymers" is used in the sense defined in British patent specification No. 715,194 (Imperial Chemical Industries Limited), published September 8, 1954.

If the grafted copolymer should have a tendency to discolour on heating, for example in alkaline scouring baths, it is advantageous to graft the polymer on to acrylonitrile in the presence of a polyglycol or an ester or ether of a polyglycol, which compounds act as heat stabilising agents for the grafted copolymers. Methoxy polyglycols of molecular weight about 300–400 are particularly suitable.

In carrying out the polymerisation according to this invention it is preferred to add a reducing agent such as sodium hydrosulphite or metallic zinc to the polymerisation mixture in sufficient quantity to remove any traces of thiocyanogen which may be present as impurity in the thiocyanate salt. A further quantity of reducing agent may also be added at the end of the polymerisation to destroy the catalyst.

The invention is illustrated by the following examples. Parts and percentages are by weight:

Example 1

0.7 gram of sodium hydrosulphite was dissolved in a litre of an aqueous sodium thiocyanate solution having a density at 20° C. of 1.30, corresponding approximately to a 50 percent solution. 0.25 gram of $\alpha,\alpha'$ azobisisobutyronitrile was dissolved in 160 grams of a mixture of 92 percent of acrylonitrile and 8 percent of methyl acrylate and the solution was added with stirring to the sodium thiocyanate solution at 75–80° C. The resultant solution was stirred in this temperature range for 3 hours; during this time the solution thickened gradually and became slightly yellow.

The solution obtained can be de-aerated and spun directly for example into a coagulating bath as described in the above mentioned British patent specification Number 732,135. Alternatively 5–10 percent of methanol may be added and the solution, after de-aeration, spun into a coagulating bath as described in British patent specification Number 729,472.

Example 2

520 parts of an approximately 50 percent aqueous solution of sodium thiocyanate (density at 20° C. of 1.30) were heated to 82° C. and a mixture of 1.0 part of diazoaminobenzene, 78 parts of acrylonitrile and 3 parts of methyl acrylate was stirred in. The stirring was continued at the same temperature for 2 hours during which time the deep yellow solution became very viscous under vigorous gas evolution. 0.6 part of sodium hydrosulphite was then stirred in to destroy the catalyst, the solution then turning light yellow.

The resultant solution was deaerated and spun directly into a coagulating bath consisting of a solution of 15 parts of sodium thiocyanate dissolved in 85 parts of water. The fibres had a denier of 1.8, a dry tenacity of 3.36 grams per denier, and extensibility 32.4 percent.

Example 3

520 parts of a 50 percent aqueous sodium thiocyanate were heated to 80° C. and 96 parts of acrylonitrile, 4 parts of methyl acrylate, 4.4 parts of lauryl 1.3 propylenediamine neutralised with glacial acetic acid and 0.3 part of azobisisobutyronitrile were added and stirred in to form a solution. The temperature was kept at 77 to 85° C. for two hours during which time the solution became slightly turbid, very viscous and slightly brown in colour.

The solution was deaerated and spun directly into a coagulating bath as described in Example 2. The fibres obtained showed improved dyeing properties and had a pleasant soft handle.

Example 4

A mixture of 520 parts of a 50 percent aqueous sodium thiocyanate solution and 6 parts of a polyethyleneimine neutralised with acetic acid (molecular weight 30,000 approximately) was heated to 80° C. and then a solution of 0.3 part of azobisisobutyronitrile, 96 parts of acrylonitrile and 4 parts of methyl acrylate were added. After 5 minutes polymerisation set in and the solution became increasingly viscous and slightly yellow and bubbles of nitrogen were evolved. The temperature of the solution rose to 90–92° C. and the solution was therefore cooled to 80° C. Polymerisation was completed after 90 minutes, and 0.3 part of sodium hydrosulphite was added to neutralise the catalyst.

The solution was spun as described in Example 2 to give white fibres having a soft handle.

Example 5

Phenyl diazoamino-N-diethyl ethylene diamine was prepared by diazotising aniline and coupling the resultant diazo compound with N,N-diethyl-ethylene diamine.

325 parts of a 50 percent aqueous sodium thiocyanate solution were heated to 70° C. and a solution of 0.34 part of the phenyl diazoamino-N-diethyl ethylene diamine dissolved in 39 parts of acrylonitrile and 1.5 parts of methyl acrylate. The solution formed which was kept at approximately 70° C. was yellow and became increasingly viscous, gas bubbles being evolved during the polymerisation. After 1½ hours 0.3 part of sodium hydrosulphite was added to destroy the catalyst; the solution was then pale yellow and was suitable for use as a spinning solution.

Example 6

*Preparation of catalyst (diazoanhydride).*—1.44 parts of 3-aminoquinoline were dissolved in 30 parts of N sulphuric acid. The solution was cooled to 3° C. and a concentrated aqueous solution of 1 part of sodium nitrite was carefully stirred in. One-fifth aliquot of the diazonium salt solution was treated with 4 parts of N sodium hydroxide to form a diazotate which reacted with the remaining diazonium salt to form diazoanhydride which was filtered off, washed and stored as wet paste.

*Polymerisation.*—0.1 mol percent of diazoanhydride in paste form was added to a solution of 13 percent of acrylonitrile and 0.4 percent of methyl acrylate in a 50 percent aqueous sodium thiocyanate solution. Polymerisation started immediately, the temperature rising to 53° C. The temperature was lowered to 40° C. by cooling and kept at this temperature throughout polymerisation; after 15 minutes a further lot of 0.1 mol percent of diazoanhydride was added and after a further 75 minutes a third lot of the same quantity was added. The solution was then very viscus and a deep orange colour. 2 hours after the start of the polymerisation sufficient sodium hydrosulphite was added to neutralise the catalyst and the solution was stirred for 30 minutes. The solution, which was a pale brown to yellow colour, was spun as described in Example 2 to give threads which had an improved affinity for acid dyes.

Example 7

*Preparation of catalyst (p,p'-dinitro diphenylazosulphone).*—200 ml. of absolute ethyl alcohol were saturated with sulphur diozide. 14 grams (0.1 mole) of p-nitroaniline were dissolved in this solution which was cooled to 15° C.; a solution of 25 grams of potassium nitrite in 10 ml. of water was slowly introduced with efficient stirring. A further 50 ml. of absolute ethylalcohol saturated with sulphur dioxide were added during the addition of the potassium nitrite solution. A heavy yellow precipitate was obtained.

After standing for 24 hours at 0° C. an excess of water was added to dissolve the inorganic salts and to precipitate the diazosulphone which was filtered off, washed with water, dilute acid and water again. The azo-compound p,p'-dinitro diphenylazosulphone when recrystallised from dilute ethyl alcohol, melted between 117–120° C. under decomposition.

*Polymerisation.*—A solution of 540 ml. of a 50 percent aqueous sodium thiocyanate solution containing 80 ml. of acrylonitrile and 4 percent of its weight of methyl acrylate was heated to 50° C. and 2.4 grams of p,p'-dinitro diphenylazosulphone (=0.3 mol percent on monomers) were added. A vigorous reaction took place, the temperature rose to 75° C. and nitrogen was evolved. The temperature was lowered to and kept at 50° C. by the addition of a solution of 180 ml. of 50 percent aqueous sodium thiocyanate solution containing 80 ml. acrylonitrile with 4 percent of its weight of methyl acrylate.

After 2 hours the reaction was practically complete and the polymer solution was treated with 10 grams of zinc dust and 10 ml. of glacial acetic acid at 75° C. for one hour. By this treatment the introduced nitro groups were reduced to amino groups and the colour of the solution was greatly improved to a pale yellow.

Fibres spun from this polymer solution showed a marked improvement in their affinity to acid, dispersed and basic dyes.

Example 8

Diazoamino tetrazole was prepared by the process described in Berichte, volume 43 (1910), page 1866.

0.5 part of diazoamino tetrazole was suspended in 450 parts of a 50 percent aqueous sodium thiocyanate solution and the mixture was heated at 70° C. until the diazoamino tetrazole dissolved to form a pale yellow solution. 100 parts of a 96 percent acrylonitrile-4 percent methyl acrylate solution were then added at the same temperature, whereupon fine gas bubbles were formed and the solution turned reddish brown. After about 5 minutes a vigorous reaction set in and the temperature rose above 70° C. The temperature was brought down to 70° C. and this was maintained for 70 minutes during which time the viscosity of the solution increased steadily. 1 part of sodium hydrosulphite was then added and the solution once again turned pale yellow. Unreacted monomers were removed by distillation under reduced pressure and the solution, after deaeration was spun directly into a coagulating bath as described in Example 2.

The fibres obtained were white, had a satisfactory heat-stability and showed improved dyeing properties.

Example 9

1,000 ml. of a 50 percent aqueous sodium thiocyanate solution, 17 grams of a solution containing 50 percent of polyethyleneimine and 2 grams of methoxy polyethylene glycol (molecular weight 350) were mixed together and the mixture was heated to 82° C. to form a solution (A).

A monomer mixture (B) was prepared consisting of 172 grams of acrylonitrile, 8 grams of methyl acrylate and 0.8 gram of azobisisobutyronitrile. One third of the mixture B was then added with stirring to the solution A at 82° C. and the temperature was kept at 80–82° C. Aftere 20 minutes the remaining mixture B was added gradually to the heated polymerising mixture over a period of 30–45 minutes. The temperature was raised slowly over the additional period to 90° C. and after 1 hour's further heating at this temperature the polymerisation was complete.

Unreacted monomers were removed from the solution by distillation under reduced pressure and the solution of a graft copolymer of polyethyleneimine and polyacrylonitrile was extruded into a coagulant bath as described in Example 2 to give white threads having an affinity for acid dyes.

Example 10

1,000 ml. of a 50 percent aqueous sodium thiocyanate solution, 9 grams of a polyvinylalcohol (molecular weight approximately 1,000) and 2 grams of polyethylene glycol phosphate were mixed together and the mixture was heated to 82° C. This solution was then used in place of solution A as described in Example 9 to prepare a graft copolymer of polyvinyl alcohol and polyacrylonitrile.

Threads were formed from the solution by extrusion of the solution into a coagulant bath as described in Example 2. The threads obtained had an affinity for basic, direct, dispersed and neutral dyeing acid dyes.

Any primary polymer which has not been grafted is automatically washed out in the spinning bath and is therefore recycled into the process with the recovered spinning bath; no additional equipment is therefore required and there are substantially no material losses.

Example 11

*Preparation of catalyst (potassium azo disulphonate).*—5 grams of potassium hydrazine disulphonate (see Berichte 59 (1926), pages 135–139) was suspended in 25 ml. of methanol. The suspension was cooled to −10° to −20° C. and 50 ml. of sodium hypochlorite solution (7 percent available chlorine) was added slowly with stirring, the temperature being kept below −10° C. The mixture was stirred for 10 minutes more after all the hypochlorite had been added whereupon it was filtered at once and washed with cold methanol. The product, potassium azo disulphonate, was obtained as a moist powder in 90 percent yield.

*Polymerisation.*—The product, while still wet, was added in several approximately equal portions to a solution of 152 grams of acrylonitrile and 8 grams of methyl acrylate in 1300 grams of aqueous 50 percent sodium thiocyanate solution. The mixture was well stirred and kept at 30° C. by external cooling. After about 70 minutes 75 percent of the monomers had polymerised to form a pale yellow solution which, after removal of unreacted monomers by distillation under reduced pressure, was suitable for spinning as described in Example 2. The threads obtained dyed well with basic and dispersed dyes.

Example 12

*Preparation of catalyst (1-aminobenzene sulphinic acid).*—Acetanilide (20 g.) was reacted with 90 grams of chlorosulphonic acid to form p-acetylamino-benzene sulphonyl chloride and this in turn was reduced using zinc dust to the corresponding sulphinic acid. Finally the acetyl group was removed by saponification with caustic soda, followed by neutralisation of excess soda by hydrochloric acid to form the catalyst

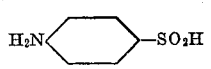

*Polymerisation.*—A mixture of 97 percent of acrylonitrile and 3 percent of methyl acrylate was dissolved in a 50 percent aqueous sodium thiocyanate solution to give a 20 percent solution. About 1 percent of p-aminobenzene sulphinic acid (based on the weight of monomers) was added and the mixture was heated on a water bath at 70° C. After 1½ hours the viscosity of the solution had noticeably increased; after 4 hours the solution was ready for spinning into threads as described in Example 2.

What I claim is:

1. A process for the production of a solution of a polymer of acrylonitrile containing at least 80% by weight of acrylonitrile in the polymer, which solution is capable of being extruded dirrectly into a coagulating bath without previous precipitation, comprising dissolving a substance consisting essentially of a polymerizable material selected from the group consisting of monomeric acrylonitrile and mixtures of acrylonitrile with styrene, methyl acrylate, vinyl acetate and vinyl pyridine, said mixtures containing at least 80% acrylonitrile, in an aqueous solution containing about 35% by weight thiocyanate ion as the sole inorganic anionic component, adding a catalyst selected from the group consisting of azo-bis isobutyronitrile, azo-bis-isobutyric acid esters, diazoaminobenzene, phenyl-diazoamine-N-diethyl ethylene diamine, diazoaminotetrazole, p,p'-dinitro-diphenyl-azosulfone, diazoanhydride, potassium azo-disulfonate, diazonium diphenylamine, p-amino-benzene sulfinic acid and mixtures thereof, to the solution as the sole polymerization catalyst, and heating the solution to at least 50° C. to polymerize said material in said solution.

2. The process claimed in claim 1 in which the aqueous solution contains about 50% by weight of sodium thiocyanate.

3. The process as claimed in claim 1 wherein the solution contains a polyvinyl alcohol having a molecular weight of about 500 to 1000 whereby a solution of a graft copolymer containing acrylonitrile units is obtained.

4. A process for the production of a solution of a polymer of acrylonitrile containing at least 80% by weight of acrylonitrile in the polymer, which solution is capable of being extruded directly into a coagulating bath without previous precipitation, comprising dissolving a substance consisting essentially of a polymerizable material selected from the group consisting of monomeric acrylonitrile and mixtures of acrylonitrile with styrene, methyl acrylate, vinyl acetate and vinyl pyridine, said mixtures containing at least 80% acrylonitrile, in an aqeous solution containing about 35% by weight thiocyanate ion as the sole inorganic anionic component, adding azo-bis-isobutyronitrile to the solution as the sole polymerization catalyst, and heating the solution to at least 50° C. to polymerize said material in said solution.

References Cited in the file of this patent

UNITED STATES PATENTS

| 2,471,959 | Hunt | May 31, 1949 |
| 2,486,943 | Hammer et al. | Nov. 1, 1949 |
| 2,648,647 | Stanton et al. | Aug. 11, 1953 |
| 2,648,648 | Stanton et al. | Aug. 11, 1953 |

FOREIGN PATENTS

| 1,054,343 | France | Oct. 7, 1953 |

OTHER REFERENCES

Noller: "Chemistry of Organic Compounds," page 312 (1951), W. B. Saunders Co., Philadelphia, Pa.